United States Patent
Godse et al.

(10) Patent No.: US 7,127,049 B2
(45) Date of Patent: Oct. 24, 2006

(54) SYSTEM AND METHOD FOR ENHANCING THE ACTIVATION OF DSL SERVICE

(75) Inventors: Dhananjay Godse, Kanata (CA); Michael Gazier, Nepean (CA)

(73) Assignee: Ciena Corporation, Linthicum, MD (US)

( * ) Notice: Subject to any disclaimer, the term of this patent is extended or adjusted under 35 U.S.C. 154(b) by 251 days.

(21) Appl. No.: 10/298,238

(22) Filed: Nov. 14, 2002

(65) Prior Publication Data

US 2003/0131107 A1    Jul. 10, 2003

(30) Foreign Application Priority Data

Nov. 14, 2001    (CA) .................................... 2361971

(51) Int. Cl.
*H04M 11/00*    (2006.01)
(52) U.S. Cl. .................. 379/93.28; 379/93.29; 379/90.01; 375/222
(58) Field of Classification Search ............ 379/93.28, 379/93.29, 90.01, 93.07, 93.14, 9.02, 9.03; 370/254, 469; 709/222, 250
See application file for complete search history.

(56) References Cited

U.S. PATENT DOCUMENTS

| | | | |
|---|---|---|---|
| 5,010,329 A | 4/1991 | Nagakura | |
| 5,668,857 A * | 9/1997 | McHale | 379/93.07 |
| 5,926,476 A | 7/1999 | Ghaibeh | |
| 5,953,389 A * | 9/1999 | Pruett et al. | 379/9 |
| 6,006,017 A | 12/1999 | Joshi et al. | |
| 6,118,768 A * | 9/2000 | Bhatia et al. | 370/254 |
| 6,125,390 A * | 9/2000 | Touboul | 709/223 |
| 6,744,759 B1 * | 6/2004 | Sidhu et al. | 370/356 |

OTHER PUBLICATIONS

Auto-Configuration for the Connection Between the DSL Broadband Network Termination (B-NT) and the Network using ATM; *DSL Forum Technical Report*, TR-037 (Mar. 2001); pp. 1-15.

* cited by examiner

*Primary Examiner*—Melur Ramakrishnaiah
(74) *Attorney, Agent, or Firm*—Merek, Blackmon & Voorhees, LLC

(57) ABSTRACT

A system enhances automation of activating network service between a customer modem and a central office modem over a digital subscriber line (DSL) link. The central office modem couples the customer modem to a network for providing the network service. The system comprises a polling system coupled with the central office modems. The polling system polls inactive central office modems in order to detect the presence of an associated customer modem. A discovery application is coupled with the polling system and the central office modems for selectively enabling ones of the central office modems in accordance with a result of the polling system. If the polling system detects the presence of the customer modem, the associated central office modem is enabled for providing network service to a customer.

31 Claims, 2 Drawing Sheets

SYSTEM AND METHOD FOR ENHANCING THE ACTIVATION OF DSL SERVICE

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention relates generally to Digital Subscriber Line (DSL) technology, and specifically to a system and method for reducing manual requirements for activating such technology.

Remote access and retrieval of data is becoming increasingly popular in data communication. The proliferation of the Internet has provided a vast network of information that is available to the general public. As the Internet grows and technology advances, this information is becoming increasingly voluminous and the details are become increasingly intricate. What used to be mainly text information has grown to include still and moving images as well as sound. The increase in volume of information to be transferred has presented a need for a high-speed Internet connection, since traditional telephone modems communicate at speeds too slow for efficient communication.

One proposal for high-speed communication is the introduction of Digital Subscriber Line (DSL) technology. One of the most attractive features of DSL is that it is implemented using an infrastructure that already exists. DSL shares copper twisted pair lines typically used for telephone communication. However, only a small portion (0 to 4 kHz) of the available bandwidth of the twisted pair line is used for Plain Old Telephone Service (POTS). DSL takes advantage of the available frequency spectrum from 4 kHz to approximately 1.1 MHz for transmitting data.

A DSL modem is a device that modulates and demodulates signals across a DSL physical interface. An ATU-R modem is located at a customer's site and an ATU-C modem is located in a central office (CO) or remote terminal (RT) of a loop provider. When the modems initialize at power-up, they attempt to train and synchronize their signals with each other.

The ATU-C is administratively enabled or disabled as a part of managing a network element in which it resides. The ATU-C is administratively enabled if a DSL subscriber has requested service on the line connected to that ATU-C. If there is no DSL subscriber on that link, then the ATU-C is disabled.

Referring to FIG. 1, a typical DSL data service connection to the Internet is illustrated generally by numeral 100. A plurality of ATU-Rs 102 are coupled to associated ATU-Cs 104 via twisted pairs 106. The ATU-Cs 104 are located in a remote terminal or CO 110 and are coupled to an access network 108. The access network 108 couples the ATU-Cs 104 to the Internet 112 via a gateway 109. An element management system (EMS) 114 is coupled between an operations support system (OSS) 116 and the access network 108.

While the following implementation specifically describes an Asynchronous Transfer Mode (ATM) access network, it will be apparent to a person skilled in the art that the access network could be other networks such as Synchronous Optical Network (SONET), Internet Protocol (IP), and the like. In order for a customer to request DSL service on a particular line, the following procedure occurs. The OSS 116, which is partially manually operated and partially computerized, determines whether service is available for the line and optionally determines whether the twisted pair has availability for the required DSL bandwidth. Using the EMS 114, the ATU-C 104 is provisioned with DSL service data and the ATU-C 104 is administratively enabled. Using the EMS 114 and/or a network management system (NMS), a circuit (such as an ATM permanent virtual circuit (PVC)) is provisioned from the ATU-C 104 through the ATM access network 108 to the Internet 112 via the gateway 109, such as a subscriber management system (SMS). A PVC is a software-defined logical connection/path in a network. This path is illustrated in FIG. 1 by dotted lines. For example, the PVC connects the customer to the customer's Internet Service Provider's point of presence on the Internet.

The customer installs the ATU-R 102 and connects an Internet Protocol (IP) device such as a personal computer (PC), Voice over ATM integrated access device (IAD), or Voice over IP (VoIP) IAD. The ATU-R 102 powers up and attempts to train with the ATU-C 104. After a successful training, the ATU-R 102 typically uses ATM configurations such as virtual circuit identifiers (VCIs) and their associated traffic characteristic, layer 2+ configurations such as a Point-to-Point Protocol over Ethernet (PPPoE) related configuration, or such as a PPPoE user id (e.g., User@isp.com) and password, and may also require layer 3 configuration data. (The "layers" refer to the 7-layer Open Source Initiative [OSI] model.) The customer can then start IP traffic. For example, a World Wide Web (WWW) homepage can be downloaded using hypertext transfer protocol (HTTP)/Transmission Control Protocol (TCP)/Internet Protocol (IP). That is, the customer is connected to the Internet.

In DSL networks as described above, the process for configuring DSL service is very laborious and time-consuming. Specifically, some of the steps involved may include order entry, loop qualification, provisioning DSL interfaces, provisioning ATM virtual circuits to the voice or data network, provisioning Point-to-Point Protocol (PPP) user id's, provisioning internal network tunnels, and the like. Each of these steps requires manual action at the EMS 114, NMS or OSS 116, and takes time. This translates into high labor costs to activate service, and a high opportunity cost of slow service activation. Furthermore, the carrier—not the customer—controls all of the main steps.

Therefore, there is a need for a system and method that provides enhanced activation of DSL subscriber lines. It is an object of the present invention to obviate or mitigate at least some of the above-mentioned disadvantages.

SUMMARY OF THE INVENTION

In accordance with an aspect of the present invention, there is provided a system for enhancing automation of activating a network service between a customer modem and a central office modem. The central office modem couples the customer modem to a network for providing the network service. The system includes a polling system coupled with the central office modems. The polling system polls inactive central office modems in order to detect the presence of an associated customer modem. A discovery application is coupled with the polling system and the central office modems for selectively enabling ones of a plurality of the central office modems in accordance with a result of the polling system. If the polling system detects the presence of the customer modem, the associated central office modem is enabled for providing network service to a customer.

In accordance with a further aspect of the invention, there is provided a web page server for providing the customer with a service web page. The service web page allows the customer to select properties of the network service for self-enabling the network service.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
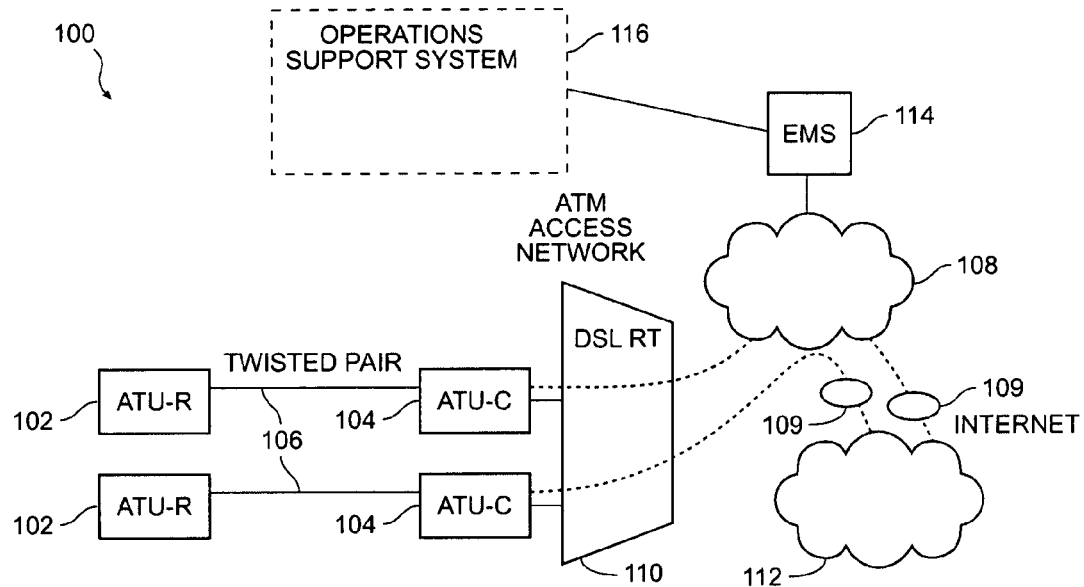
FIG. 1 is a schematic diagram of a typical DSL data connection system (prior art)
Figure 2:
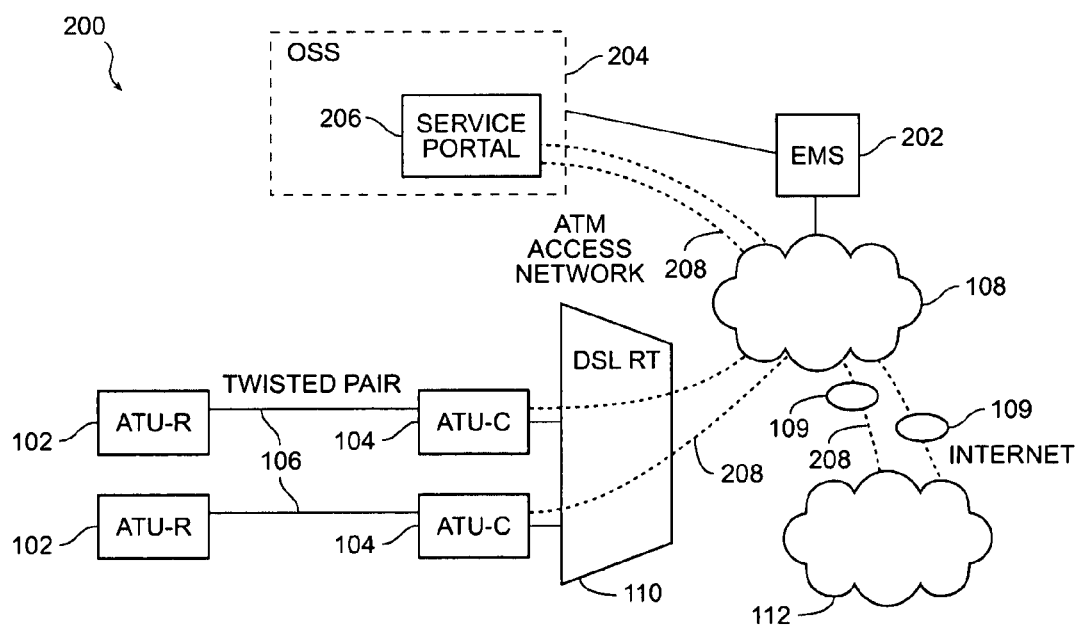
FIG. 2 is a schematic diagram of a DSL data connection system in accordance with an embodiment of the present invention.

For convenience, like numerals in the description refer to like structures in the drawings. Referring to FIG. 2, a DSL data service connection to the Internet in accordance with an embodiment of the invention is illustrated generally by numeral 200. A plurality of ATU-Rs 102 are coupled to associated ATU-Cs 104 via twisted pairs 106. The ATU-Cs 104 are located in a remote terminal 110 and coupled to an access network 108. The access network 108 selectively couples the ATU-Cs 104 to the Internet 112. An element management system (EMS) 202 is coupled between an operations support system (OSS) 204 and the access network 108. The OSS 204 further comprises a service portal 206. The EMS 202 enables network managers to provision, manage, and monitor nodes within the access network 108.

In the present embodiment, most customer loops are able to run Asymmetric DSL (ADSL) without manual intervention on the physical loop, or twisted pair 106. This can be achieved by pre-installing DSL for every line by adding a POTS-splitter and a digital subscriber line access multiplexer (DSLAM) for every line. Optionally, an integrated ATU-C POTS/DSL line card may be used that provides POTS and DSL on every line. Such a line card eliminates the need for rewiring between POTS splitters, DSLAMs, and digital loop carriers (DLCs), which are typically required for ensuring that DSL is available at every ATU-C line. If the loop can be proven to work without intervention from the OSS 204, or if the failure rate is low enough, the need for loop qualification can be reduced or eliminated. This is true because loops are assumed to be operational until a failure is reported, as will be described in detail below.

A network operator installs the remote terminal 110 and pre-configures ADSL service data for each ATU-C 104. However, each ATU-C 104 is disabled, which provides lower power consumption than if each ATU-C 104 is enabled. An ATM PVC 208 is provided from each ATU-C 104 to a service portal 206 in the OSS 204 via the access network 108. The PVCs 208 are illustrated in FIG. 2 by dotted lines.

The service portal 206 is a part of the OSS 204 and, thus, is aware of which ATU-C 104 maps to which ATM VCI (or other connection identifier) as well as customer identification data of the line that is stored on the OSS 204. The customer identification data includes information for billing the client, which typically includes the customer's telephone number, address, and the like. The service portal 206 can also request other data from the EMS 202 for a particular ATU-C 104. The other data includes the type of service available to the customer and the communication rate actually trained on the DSL line. Typically, the communication rate varies from approximately 512 kbps to approximately 6 Mbps.

A discovery application runs on the EMS 202 and polls each administratively-disabled DSL line for an ATU-R 102 presence. The polling is achieved by automatically enabling each of the disabled ATU-Cs 104, which causes them to attempt to retrain. In the present embodiment, each of the disabled DSL lines is polled serially. In an alternate embodiment, the disabled DSL lines may be polled in parallel. In yet an alternate embodiment, the disabled DSL lines may be polled as a combination of parallel and serial polling. That is, for example, five lines can be polled at a time. For the present embodiment, serial polling was selected to reduce the load of polling on a Central Processor Unit (CPU) of the EMS 202. Further, since each enabled DSL line consumes power, less power is dissipated for serial polling than for parallel polling. Lastly, while parallel polling will typically reduce the time required to detect the enabling of a previously-disabled DSL line, the time required by serial polling is sufficient for most cases. For example, using serial polling, a 15-minute delay (and possibly even less) can be reasonably attained. Thus, the customer is prompted to plug-in the ATU-R 102 and told that it will be enabled within 15 minutes.

If the ATU-C 104 retrains, then the retraining bandwidth is known after approximately 15 seconds, which implies that a DSL modem is present at the customer premises. If a DSL line driver at the ATU-C 104 does not receive a response from the ATU-R 102, it implies that no ATU-R 102 is present at the customer premises. As a result, the DSL line driver sends a message to the EMS 202 that service to that particular DSL line is not available. As an example of such a signal, the line driver may send a "bandwidth=0" response to the EMS 202, although the exact signal or even the existence of such a message is implementation-specific. The discovery application automatically disables the ATU-C 104 for such a line. If an ATU-R 102 is present at the customer premises and plugged in, the ATU-C 104 will be able to establish communication with the ATU-R 102, thus "discovering" its presence. The bandwidth and other characteristics of the line are transmitted to the EMS 202, and the ATU-C 104 remains enabled.

As previously mentioned, a reasonable polling frequency can be determined by a network operator, as will be appreciated by a person skilled in the art. For the purposes of the present embodiment, the polling frequency ranges from once every 15 minutes to once every hour or two. The polling frequency is configurable and can be changed by the network operator. Generally, polling more often than once every 10 minutes exerts a high processing and bandwidth cost on the element management system EMS 202. Polling less often than once every 4 days does not yield a service activation speed gain as compared to the existing manual processes.

When the customer wants ADSL service, the following procedure is followed. The customer installs the ATU-R 102, powers it up, and connects it to a personal computer (PC) or other computing device. The EMS polling application eventually turns on the ATU-C 104 in accordance with the predetermined polling frequency and trains the line. The ATU-R 102 runs an auto-discovery on the line. Auto-discovery is specified in DSL Forum WT-048, Revision 4, January 2001, and is herein incorporated by reference. (This document may also be referred to as DSL Technical Forum Technical Report TR-037, Auto-Configuration for the Connection Between the DSL Broadband Network Termination [B-NT] and the Network using ATM, March 2001.) Auto-discovery enables automatic configuration between the ATU-R 102 and exchange equipment. If, however, the auto-discovery feature is not available, then the customer configures the ATU-R 102 from the PC. Yet an alternate possibility allows the customer's PC to be configured using mechanisms such as Dynamic Host Configuration Protocol (DHCP) until the customer registers with a service provider. DHCP allows the customer to connect the network without a pre-assigned Internet Protocol (IP) address. Thus, when the customer connects to the network, a temporary IP address is assigned by the service provider, possibly through provisioning of the DSLAM.

Once the ATU-R 102 is configured, the customer downloads a service web page from the service portal 206. Alternately, the service web page could be located at the remote terminal 110. The service web page presents the customer with a DSL service order form. The service order form provides subscription choices such as grade and quality of service, Internet service provider, and the like. Once the order is entered, the parameters are verified. The service portal obtains the customer identifier data (such as billing information, which might be verified with an online credit checking service) and line data from the OSS 204 for the incoming ATM VCI. A quality of service requested by the customer is compared against the trained bandwidth on the line, which is available by querying the ATM connection admission control (CAC) either "on-node" at the remote terminal 110, or "off-node" at the EMS 202. The requested ISP can be reached, since the service portal 206 has that ISP configured as one of the choices for the specific line, in accordance with the telephone number.

After the order is qualified, the OSS 204 manually or automatically reconnects the customer to the requested ISP at the specified quality of service. This may require disconnecting the customer and forcing a new session (over PPPoE for example) or even asking the customer to reboot their PC. Some versions of Microsoft Windows® require this step in order to retrieve a new IP address from the selected ISP. At this point, the DSL customer can "surf" the Internet.

Generally, internal details such as domain names and IP addresses are hidden from the subscriber. Furthermore, in some cases, it may be necessary for the subscriber to load a software package to the Internet-connected device. As previously discussed, this depends on the particular device and operating system that the subscriber is using. These internal details may be hidden from the customer by the ATU-C 104 performing proxy operations on behalf of the customer. Specific examples of proxy operations are the subject of a co-pending Canadian application and therefore need not be described in detail.

The VC and the IP address assigned to the customer remain active until the connection is terminated. Typical events that result in the termination of a connection include the customer turning off the ATU-R 102 (PC or modem), the service provider rebooting the DSLAM, the failure of the network connection, and the like. Once the connection is terminated, the customer can reconnect by rebuilding the connection. Generally, however, the steps of auto-sensing and configuring the customer modem are bypassed, since the service provider already knows the customer is present. Thus, items such as PVC are maintained and the ATU-C 104 is kept in "enabled" mode. Items such as PPPoE session establishment and the DHCP, for example, may need to be rerun. The choice of service provider remains consistent, even through multiple disconnects. However, the customer may alter or add to the ISP selection by surfing back to the service web page, via the Internet.

Physically, the customer is connected to the ISP as follows. In some cases, a PVC is added, coupling the customer with the ISP via the remote terminal and ATM network. Alternately, if the system includes a subscriber management system (SMS), the SMS aggregates all the customers from multiple remote terminals onto a single Layer Two Tunneling Protocol (L2TP) tunnel. The L2TP tunnel communicates with an access network or core network via one VC. The network is coupled with each ISP via an associated VC. Thus, in this example a PVC need only be added to couple the customer with the SMS. Furthermore, if each customer has a pre-configured PVC to the SMS, then no new PVC needs to be configured. All that is required is to inform the SMS which new customer has been added, and to which ISP the customer should be connected.

One optional auto-configuring method is to have the PVCs configured in accordance with addendum AF-NM-0122.000 and to the ATM UNI 4.0 standard. The addendum describes how the ATU-R 102 is automatically configured with available PVCs once it powers up. As part of the standard, the ATU-R 102 queries the ATU-C 104, which downloads the list of PVCs to the ATU-R 102. The list is pre-configured by the service provider and communicated to the ATU-C 104 via the EMS 202. Typically, the default VC is VC=32, VP=0, where VP is a virtual path.

If the order cannot be qualified because of ADSL bandwidth or ATM CAC problems, then manual actions to fix the line can be taken, for example, by removing bridge taps. Alternately, the network could be re-engineered, for example, by providing more backhaul capacity. Yet alternately, a reduced level of service can be provided at least as a temporary measure.

The benefit of the system described above is that partial loop qualification is optional and, therefore, does not have to be performed manually if the customer can connect to the service portal. That is, the customer can simply purchase a modem from a retailer and plug it in to a PC. Within the waiting time previously described, typically a 15 minute maximum, the customer will be able to log on to the service web site and select the Internet service desired. This is achieved without requiring the customer to telephone a service provider and pre-arrange the connection.

In the event of a system failure, such as an ATM CAC failure or a loop qualification error, if loop qualification is performed, the customer is informed of the error. In the rare case that the bandwidth requested by the customer is not available, a manual work order, as previously described, can be triggered. However, even a low bandwidth rate is almost always sufficient for the customer to receive a service error web page from the portal explaining the failure. The service error web page further provides the customer with tools for attempting to remedy the situation, including a complaint web page for logging a complaint with the ISP, telephone contact information for the ISP, and the like. Thus, once a failure occurs, the service provider is informed explicitly of the failure. Once the problem is known, technicians can be dispatched to resolve it. Generally, this error reporting scheme results in a less expensive line setup cost for the service provider, as the need for loop qualification can be reduced and the problems are known rather than having to be anticipated. Additionally, connection qualification is performed automatically if the level of service requested is exceeded by the trained ADSL bandwidth or the available and allowed ATM capacity.

In the embodiment described above, the EMS 202 performs the polling of the ATU-Cs 104 for determining if the customer has connected an ATU-R 102. In an alternate embodiment, however, rather than the EMS 202 polling the ATU-Cs 104, the polling is managed by the remote terminal 110. Such a system can reduce the processing and bandwidth costs associated with polling as described in the previous embodiment, since it is only necessary for the remote terminal 110 to inform the EMS 202 of newly discovered lines. Thus, the frequency of the ATU-C 104 polling may be increased to further reduce the maximum activation time for the customer.

In the embodiments described above, polling of the ATU-Cs 104 is performed automatically, having a relatively fixed frequency. For example, the inactive ATU-Cs 104 are polled every 15 minutes. Therefore, as long as the inactive ATU-Cs 104 can all be polled within 15 minutes, the customer is assured of a 15 minute latency (approximately) from modem connection to activation. Alternately, the inactive ATU-Cs 104 are polled continuously. Thus, the frequency with which the ATU-Cs 104 are polled increases as the number of inactive ATU-Cs 104 decreases and vice versa. If all ATU-Cs 104 can be polled within 15 minutes, the customer is assured a maximum 15 minute latency from modem connection to activation, but may often be less.

In yet an alternate embodiment, rather than the automatic polling described above, the system uses manual polling. Manual polling requires a system operator to initiate the polling. Therefore, the ATU-Cs 104 are only polled when initiated by the system operator.

In yet an alternate embodiment, gateway "DSL routers" are used at the customer premises. This does not change the fundamental concept described above, although the specific order and partitioning of the functionality may change, as will be appreciated by a person skilled in the art. These difference include, for example, configuring a router, as opposed to configuring a PC, and the use of Network Address Translation (NAT) for IP address translation between a network address and customer premises IP addresses.

Figure 3:
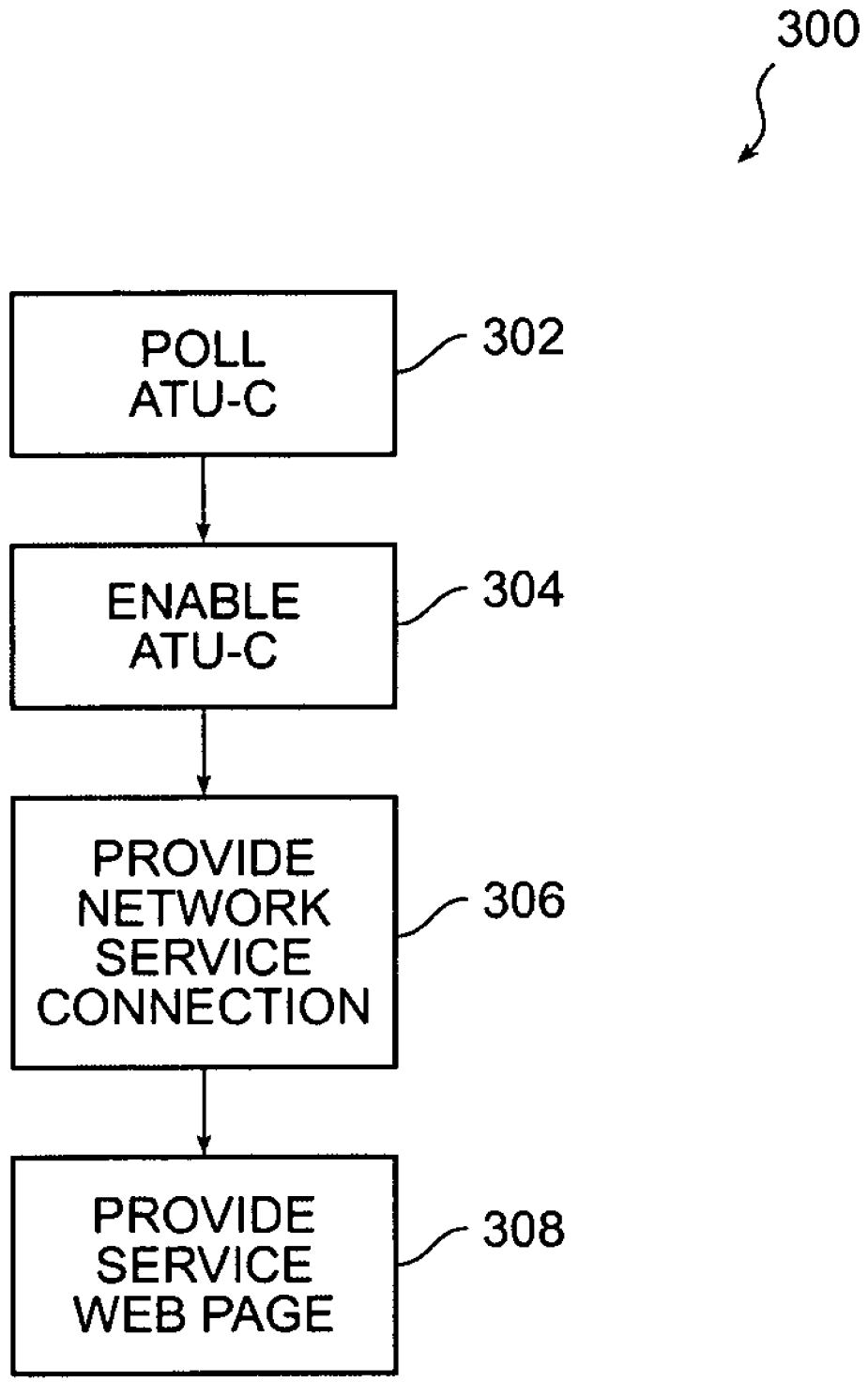
FIG. 3 is a flowchart showing the process steps performed in accordance with an embodiment of the present invention.

FIG. 3 is a flowchart showing the process steps described above for a DSL activation process 300. In step 302, the ATU-Cs 104 are polled to detect the ATU-Rs 102. In step 304, when an ATU-R 102 is detected, its corresponding ATU-C 104 is enabled. In step 306, a network service connection is provided to the detected ATU-R 102. In step 308, the customer is provided with a service web page for selecting details of the network service connection.

While the above description refers to ADSL, a person skilled in the art will appreciate that the invention can be applied to other forms of DSL technology. Also, while the connection between the ATU-C 104 and the service portal are describe as ATM PVCs, they could also be based on another layer 2 or 3 protocol combination such as, for example, a combination of ATM, IP, Point-to-Point Protocol (PPP), variations of Ethernet including for example over VDSL, and Multiprotocol Label Switching (MPLS). Accordingly, certain specific embodiments and various modifications thereof will be apparent to those skilled in the art without departing from the spirit and scope of the invention as outlined in the claims appended hereto.

What is claimed is:

1. A method for activating network service between a customer modem and a central office modem coupled via a digital subscriber line (DSL) link, said central office modem for coupling said customer modem to a network for providing said network service, said method comprising the steps of:

polling a plurality of central office modems for detecting one or more associated customer modems;

enabling one or more of said plurality of central office modems in accordance with said one or more associated customer modems that have been detected;

providing a network service connection to said one or more associated customer modems that have been detected;

receiving initial customer data at a service portal after detection of said one or more associated customer modems; and, receiving quality of service information and Internet Service Provider (ISP) information after said detection of said one or more associated customer modems.

2. A method as defined in claim 1, wherein a customer connects to said network by coupling said customer modem, which is connected to a computing device of said customer, to said DSL link.

3. A method as defined in claim 2, wherein said customer modem connects with said central office modem by running an auto-discovery on said link.

4. A method as defined in claim 2, wherein said customer modem connects with said central office modem by configuring said customer modem using said computing device.

5. A method as defined in claim 2, wherein said customer modem connects with said central office modem by using Dynamic Host Configuration Protocol.

6. A method as defined in claim 2, wherein said step of providing said network service connection further comprises the step of: providing said customer with a service web page for selecting details of said network service connection.

7. A method as defined in claim 6, wherein said details include one or more of a service provider, a connection speed, and a quality of service.

8. A method as defined in claim 2, wherein if an error occurs, an error message is sent to said customer for identifying said error, thereby reducing a need for loop qualification.

9. A method as defined in claim 8, wherein upon receiving said error, said customer is provided with contact information for informing a service provider of said error.

10. A method as defined in claim 2, wherein if an error occurs, an error message is sent to a service provider for identifying said error, thereby reducing a need for loop qualification.

11. The method of claim 1, wherein after an order associated with a new customer is qualified, the customer is reconnected to the requested ISP at the specified quality of service.

12. A method of claim 1, wherein said service portal requests information from an Element Management System (EMS).

13. A method claim 1, wherein said service portal accesses a service web page.

14. A system for automation of initially activating network service between a customer modem and a central office modem coupled via a digital subscriber line (DSL) link, said central office modem for coupling said customer modem to a network for providing said network service, said system comprising:
   a polling system, coupled with a plurality of central office modems, for polling inactive ones of said plurality of central office modems for detecting a presence of an associated customer modem;
   a discovery application, coupled with said polling system and said plurality of central office modems, for selectively enabling ones of said plurality of said central office modems in accordance with a result of said polling system,
   wherein if said polling system detects said presence of said associated customer modem, an associated central office modem is enabled for providing network service to a customer;
   a service portal for receiving initial customer identification data in response to detection of said associated customer modem; and,
   wherein said service portal receives quality of service information and ISP information after said detection of said one or more associated customer modems.

15. A system as defined in claim 14, wherein said polling systems polls said inactive ones of said plurality of central office modems at predetermined intervals.

16. A system as defined in claim 14, wherein said polling system polls said inactive ones of said plurality of central office modems continuously.

17. A system as defined in claim 14, wherein said polling system polls said inactive ones of said plurality of central office modems in response to a command from a system administrator.

18. A system as defined in claim 14, wherein said polling system polls said inactive ones of said plurality of central office modems by enabling said plurality of central office modems and attempting to train said plurality of central office modems with said associated customer modem, wherein said presence of said associated customer modem is detected if the training is successful.

19. A system as defined in claim 18, wherein if said presence of said associated customer modem is detected, said associated central office modem remains enabled, otherwise said associated central office modem is disabled.

20. A system as defined in claim 14, further including: a web page server for providing said customer with a service web page, said service web page for allowing said customer to select properties of said network service for self-enabling said network service.

21. A system as defined in claim 20, wherein said properties include one or more of a network service provider property, a connection rate property, a fixed or floating IP address property, and a payment scheme property.

22. A system as defined in claim 21, wherein said web page server notifies said customer of difficulties in fulfilling said properties of said network service that have been selected.

23. A system as defined in claim 22, further including: a service portal for providing billing information about said customer, said service portal having a pre-provisioned connection path with said associated customer modem.

24. A system as defined as in claim 23, wherein said service portal uses an identifier assigned to said pre-provisioned connection for identifying said customer.

25. A system as defined in claim 20, wherein said service web page is accessible via the Internet for allowing said customer to modify said properties after said network service is enabled.

26. A system as defined in claim 20, wherein said web page server provides said customer with an error message if an error is detected on said DSL link.

27. A system as defined in claim 14, wherein said customer is provided with contact information for contacting a service provider if an error is detected on said DSL link.

28. A system as defined in claim 14, wherein a service provider is provided with error information if an error is detected on said DSL link.

29. The system of claim 14, wherein after an order associated with a new customer is qualified, the customer is reconnected to the requested ISP at the specified quality of service.

30. A system as defined in claim 14, wherein said service portal requests information from an Element Management System (EMS).

31. A system as defined in claim 14, wherein said service portal accesses a service web page.

* * * * *